(12) United States Patent
Isaac et al.

(10) Patent No.: US 11,770,466 B2
(45) Date of Patent: *Sep. 26, 2023

(54) PROVIDING TIMING INFORMATION FROM A NETWORK VIA A VIRTUAL NETWORK ADDRESS

(71) Applicant: Juniper Networks, Inc., Sunnyvale, CA (US)

(72) Inventors: Aldrin Isaac, San Jose, CA (US); Savithri H. Venkatachalapathy, Saratoga, CA (US); Kamatchi S. Gopalakrishnan, Dublin, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/938,717

(22) Filed: Oct. 7, 2022

(65) Prior Publication Data
US 2023/0036049 A1   Feb. 2, 2023

Related U.S. Application Data

(63) Continuation of application No. 16/711,073, filed on Dec. 11, 2019, now Pat. No. 11,516,321.

(51) Int. Cl.
*H04L 69/28* (2022.01)
*H04L 12/18* (2006.01)
(Continued)

(52) U.S. Cl.
CPC .............. *H04L 69/28* (2013.01); *H04L 12/18* (2013.01); *H04L 12/4641* (2013.01);
(Continued)

(58) Field of Classification Search
CPC . H04L 69/28; H04L 61/5007; H04L 12/4641; H04L 12/18; H04L 45/50; H04L 45/64; H04L 45/72
See application file for complete search history.

(56) References Cited

U.S. PATENT DOCUMENTS

2011/0261917 A1   10/2011   Bedrosian
2011/0305307 A1*  12/2011   Wang .................. H04L 12/4633
                                                       375/362
(Continued)

OTHER PUBLICATIONS

Pallec et al. "Time and Frequency Distribution Over Packet Switched Networks" BSTJ 2009 (Year: 2009).*
(Continued)

*Primary Examiner* — Basil Ma
(74) *Attorney, Agent, or Firm* — Harrity & Harrity, LLP

(57) ABSTRACT

A network device may receive, from a timing source of a network, timing information. The network device may identify a client device to which the timing information is to be provided, wherein the network device provides an interface between the client device and the network. The network device may select a virtual network address to associate with a timing agent of the network device, wherein the virtual network address is within an address range that is reachable by the client device. The network device may provide to the client device, and via a network layer communication, a timing control packet comprising the timing information, wherein the timing control packet identifies the virtual network address as a source network address of the timing control packet, and wherein the timing information is to be used by the client device to update a clock of the client device.

20 Claims, 11 Drawing Sheets

(51) Int. Cl.
*H04L 45/50* (2022.01)
*H04L 45/64* (2022.01)
*H04L 12/46* (2006.01)
*H04L 45/00* (2022.01)
*H04L 61/5007* (2022.01)

(52) U.S. Cl.
CPC .............. *H04L 45/50* (2013.01); *H04L 45/64* (2013.01); *H04L 45/72* (2013.01); *H04L 61/5007* (2022.05)

(56) References Cited

U.S. PATENT DOCUMENTS

| | | | |
|---|---|---|---|
| 2013/0346719 A1 | 12/2013 | Tomlinson et al. | |
| 2015/0127978 A1 | 5/2015 | Cui et al. | |
| 2016/0277138 A1* | 9/2016 | Garg | H04L 41/0816 |
| 2019/0356403 A1* | 11/2019 | V.K. | H04L 41/12 |

OTHER PUBLICATIONS

Eidson, John "IEEE-1588 Standard fora Precision Clock Synchronization Protocol—Tutorial" (Year: 2005).*

Cisco Systems Inc., "Cisco Nexus 9000 Series NX-OS System Management Configuration Guide, Release 7.x especially Chapter 5 Configuring PTP," May 2016, San Jose, CA, 32 pages.

Co-pending U.S. Appl. No. 16/711,073, inventor Isaac; Aldrin, filed Dec. 11, 2019.

Eidson J., "IEEE-1588 Standard for a Precision Clock Synchronization Protocol for Networked Measurement and Control Systems-A Tutorial" Agilent Technologies, Oct. 2005, 94 pages.

IEEE Instrumentation and Measurement Society "IEEE Standard for a Precision Clock Synchronization Protocol for Networked Measurement and Control Systems", IEEE Std 1588TM-2008, Jul. 24, 2008, 289 pages.

* cited by examiner

PROVIDING TIMING INFORMATION FROM A NETWORK VIA A VIRTUAL NETWORK ADDRESS

RELATED APPLICATION

This application is a continuation of U.S. patent application Ser. No. 16/711,073, filed Dec. 11, 2019, which is incorporated herein by reference in its entirety.

BACKGROUND

Timing synchronization between devices may be important for performing financial transactions, transmitting and receiving telecommunication signals, coordinating transmission arrays, providing video over internet protocol (IP) services, and/or the like. To provide timing synchronization, one or more network devices may use precision timing protocol (PTP) to distribute timing information through a network.

SUMMARY

According to some implementations, a method may include receiving, by a network device of a network and from a timing source of the network, timing information via an underlay of the network; identifying, by the network device, a client device to which the timing information is to be provided, wherein the network device provides an interface between the client device and the network; selecting, by the network device, a virtual network address to associate with a timing agent of the network device, wherein the virtual network address is within an address range that is reachable by the client device; and providing, by the network device, to the client device, and via a network layer communication, a timing control packet comprising the timing information, wherein the timing control packet identifies the virtual network address as a source network address of the timing control packet, and wherein the timing information is to be used by the client device to update a clock of the client device.

According to some implementations, a network device may include one or more memories, and one or more processors, communicatively coupled to the one or more memories, configured to: receive, from a timing source of the network, a PTP control packet comprising timing information; identify a client device to which the timing information is to be provided, wherein the client device is to receive the timing information via a PTP over internet protocol (PTPoIP) control packet; select a virtual IP address to associate with a timing agent of the network device, wherein the virtual IP address is within an IP address range that is reachable by the client device; and provide, via a network layer communication, a PTPoIP control packet comprising the timing information, wherein the PTPoIP control packet includes the virtual IP address as a source network address of the PTPoIP control packet, and wherein the timing information is to be used by the client device to update a clock of the client device.

According to some implementations, a non-transitory computer-readable medium may store one or more instructions. The one or more instructions, when executed by one or more processors of a network device, may cause the one or more processors to: receive, from a timing source of a network, timing information; receive, from a client device, a request for the timing information, wherein the request identifies, as a destination network address, a virtual network address associated with a timing agent of the network device; provide, to the timing agent, the request via an inbound direct relaying process; receive, from the timing agent, a timing control packet comprising the timing information, wherein the timing control packet identifies the virtual network address as a source network address of the timing control packet, and wherein the timing information is to be used by the client device to update a clock of the client device; and provide, via a network layer communication and to the client device, the timing control packet comprising the timing information.

DETAILED DESCRIPTION

Figure 1A:
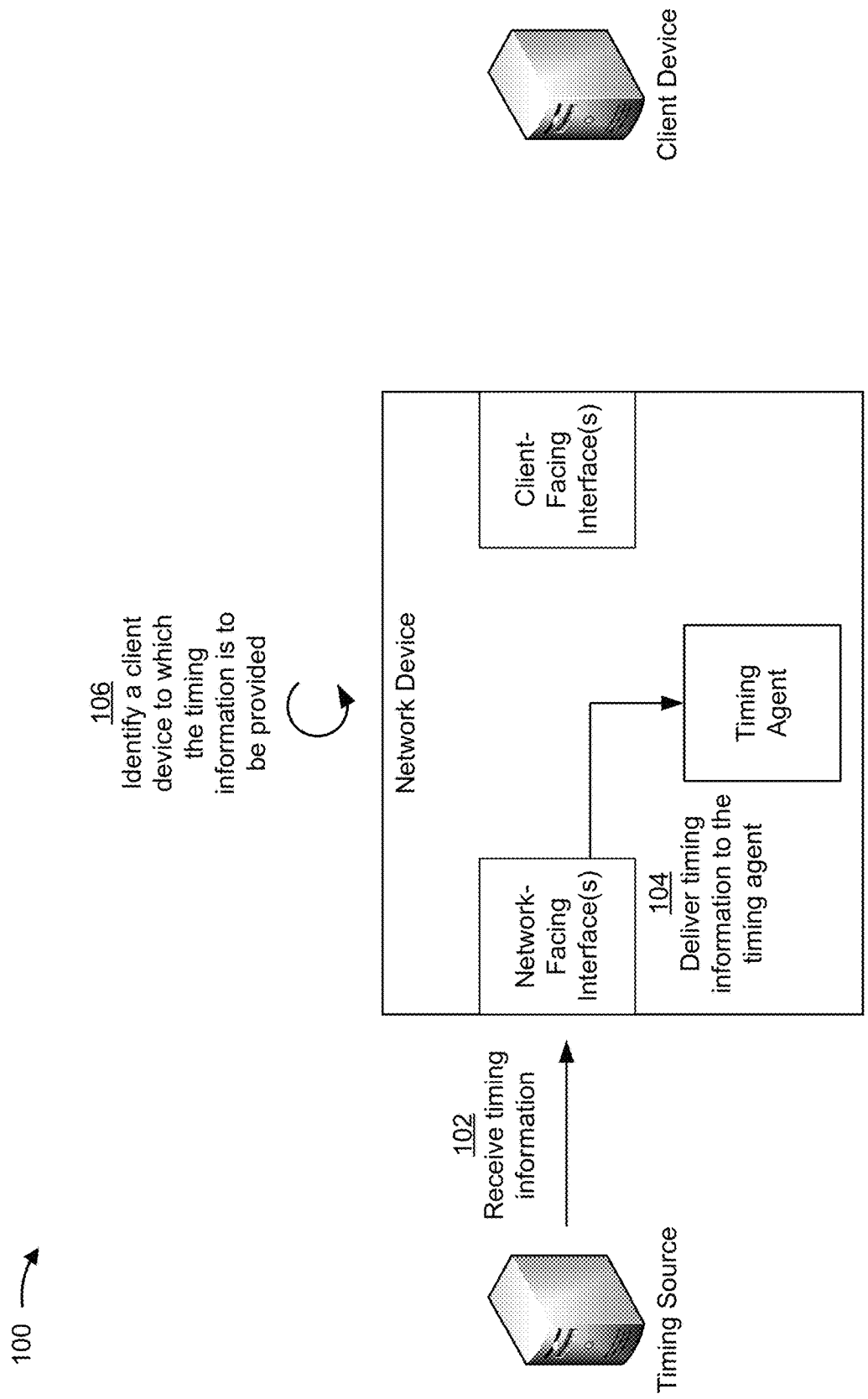
FIGS. 1A-1E are diagrams of one or more example implementations described herein.

The following detailed description of example implementations refers to the accompanying drawings. The same reference numbers in different drawings may identify the same or similar elements.

Precise timing synchronization among devices may be important in many types of communications. For example, high-frequency trading operations (e.g., for trading on one or more stock markets), telecommunication networks, IP video broadcasting networks, and/or the like may rely on accurate timing synchronization among devices to avoid or reduce communication errors.

To provide precise timing synchronization among devices, PTP may be used. In PTP, one or more devices including grandmaster clocks act as master timing sources to which other devices in the network synchronize. A device including a grandmaster clock receives timing information (e.g., via a global positioning system receiver, an atomic clock, and/or the like) and distributes the timing information to one or more connected network devices via PTP control packets. The connected network devices may further distribute the timing information to additional network devices (e.g., acting as a boundary clock or a transparent clock). For example, a transparent clock may perform corrections to the timing information that are based on amounts of time spent traversing network equipment.

Clients that provide and/or consume timing-sensitive services may use network overlays (e.g., a cloud or multi-cloud overlay) to communicate among devices of the client (e.g., at different locations). A network overlay is a virtual and/or logical network that is overlaid on a network underlay of network devices. The network underlay provides infrastructure upon which the network overlay is instantiated. The network underlay may support multiple network overlays in which clients of the multiple network overlays are isolated (e.g., in network reachability, protocol, and/or the like) from each other and from the underlay network.

If a provider attempts to synchronize devices across the overlay network (e.g., at different sites connected via the overlay network), the timing information may not include corrections based on amounts of time spent traversing network equipment (e.g., communication media, network devices, and/or the like) of the underlay network. This is because when a timing control packet is tunneled through one or more segments of the overlay network, the network devices in the underlay network may not parse the timing control packet to identify the timing control packet as including timing data that may need a correction. For example, the overlay network may include one or more tunneling services, such as a multi-protocol label switching (MPLS) network, a virtual extensible local area network (VXLAN), generic network virtualization encapsulation, tunneling over IP version 6, and/or the like. If the overlay network provides a tunneling service, data and/or control packets to be tunneled through one or more segments of the overlay network may be encapsulated with an identifier to direct the data and/or control packets through the network. Intermediate network devices may not parse the data and/or control packets beyond a tunnel header, so the intermediate network devices do not identify the encapsulated data and/or control packets by type or content. Without identifying a PTP control packet as including timing information that needs a correction, the intermediate network devices may not provide the correction and the timing information may include an error based on an amount of time spent traversing the network.

According to some implementations described herein, a network device includes a timing agent that provides timing information from the network to a client device. The network device may receive timing information (e.g., via a PTP control packet) from a timing source of the network. The network device may provide an interface between a client device and the network. For example, the network device may be an ingress node, a provider edge node, and/or the like. The network device may identify a client device to which the timing information is to be provided. For example, the client device may request timing as a service from a provider of the network. The network device may select a virtual network address (e.g., a virtual IP address) to associate with the timing agent so that the virtual network address is within an address range that is reachable by the client device. In some implementations, the virtual network address may match a subnet, a protocol, and/or the like of the network address of the client device. The network device may provide, to the client device, a timing control packet including the timing information via a network layer communication. The timing control packet may identify the virtual network address as a source network address of the timing control packet so the client device can identify a network address from which the client device may receive additional timing control packets and/or to which the client device may address requests for additional timing control packets. The timing information may be used by the client device to update a clock of the client device.

In this way, the network may provide synchronized timing information to client devices without, or with a reduction of, errors caused by time spent traversing network equipment of the network. This may allow a client to operate client devices to perform operations that rely on accurate timing synchronization, such as telecommunication services, IP video broadcasting, and/or the like. This may also reduce errors in communications between client devices and may reduce computing and network resources that may be used to identify and/or correct the errors in the communications.

In some implementations, another network device may perform similar operations for additional client devices associated with the client device (e.g., other client devices associated with the same client as the client device). For example, a first network device may provide the timing information to a first client device at a first site and a second network device may provide the timing information to a second client device at a second site. Each of the first network device and the second network device may receive the timing information, directly or indirectly, from a device of the network that includes a grandmaster clock, and may be synchronized so that the timing information is synchronized before being sent to the first client device and the second client device. In some implementations, a first timing agent on the first network device is associated with the same virtual network address as a second timing agent on the second network device. In this way, the network may only need to manage a single virtual network address for providing timing information to client devices at different sites of a client. This may reduce an amount of computing resources (e.g., processor resources, memory resources, communication resources, and/or the like) and/or network resources consumed by managing multiple virtual network addresses for a single client, which computing and/or network resources may multiply if managing multiple virtual network addresses for multiple clients supported by the network underlay.

FIGS. 1A-1E are diagrams of one or more example implementations 100 described herein. As shown in FIGS. 1A-1E, the example implementation(s) 100 may include a timing source, a client device, and a network device having one or more network-facing interfaces, one or more client-facing interfaces, a timing agent, and/or the like. The network device, the timing source, the client device, and/or other included devices may comprise hardware, firmware, or a combination of hardware and software and may include, for example, switches, routers, servers, security devices, and/or the like.

The network device may be part of a network that includes a plurality of network devices. The network may include an underlay network that provides infrastructure to support one or more overlay networks. For example, the underlay network may provide a data transport service (e.g., an MPLS network, VXLAN, and/or the like) to transport data packets between the client device and other client devices (e.g., at other physical locations). The client device may have visibility to one or more prospective connections provided by the overlay network (e.g., with other client devices accessible via the overlay network). The underlay network and/or the one or more overlay networks may be transparent to clients. The overlay network may provide one or more prospective connections visible to the client device via a service type ethernet bridging, IP routing, integrating routing and bridging, and/or the like.

The client device may include one or more devices, which may be part of a local network of client devices at a physical location (e.g., an office building). In some implementations, the client device may be a physical endpoint (e.g., a device assigned to a network address) or a virtual endpoint (e.g., an agent of a device that is assigned to a network address). In some implementations, the underlay network is transparent to the client device. In some implementations, the overlay network may provide one or more prospective connections visible to the client device (e.g., prospective connections with other client devices accessible via the overlay network). In some implementations, the client device is configured to receive timing information over network layer communications (e.g., PTPoIP control packets).

As shown in FIG. 1A, and by reference number 102, the network device may receive timing information, directly or indirectly, from a timing source. In some implementations, the network device may receive the timing information via a timing control packet received over the underlay network (e.g., using a PTP control packet). For example, the network device may receive the timing information as an ethernet layer communication from the timing source.

The timing control packet may be routed through one or more additional network devices and/or may include one or more corrections to the timing information. For example, the timing control packet may include a field for the network device and/or one or more additional network devices to insert an indication of an amount of time spent traversing the network (e.g., a hop of the network, a segment of the network, multiple hops and/or segments of the network).

As shown by reference number 104, the network device may deliver the timing information to the timing agent via the one or more network-facing interfaces. In some implementations, the timing information may be included in a PTPoIP control packet, a PTP over ethernet (PTPoE) control packet, and/or the like. The timing agent or another component of the network device may determine a synchronized time value based on a time value in the timing control packet, the one or more corrections, one or more additional corrections based on an amount of time spent within the network device, and/or an amount of time expected to be spent traversing network equipment to arrive at the client device.

As shown by reference number 106, the network device may identify a client device to which the timing information is to be provided. For example, the network device may receive a policy from a policy device that identifies client devices to which timing information is to be provided. If the network device provides an interface to a client device that is identified in the policy, the network device may identify the client device as a client device to which the timing information is to be provided. In some implementations, the network device may provide, to the policy device or a network administration device, identifications of client devices for which the network device provides interfaces. The network device may receive a response from the policy device or the network administration device identifying one or more of the client devices to which the timing information is to be provided. In some implementations, the timing source or another network device may provide instructions to the network device identifying one or more of the client devices to which the timing information is to be provided.

Figure 1B:
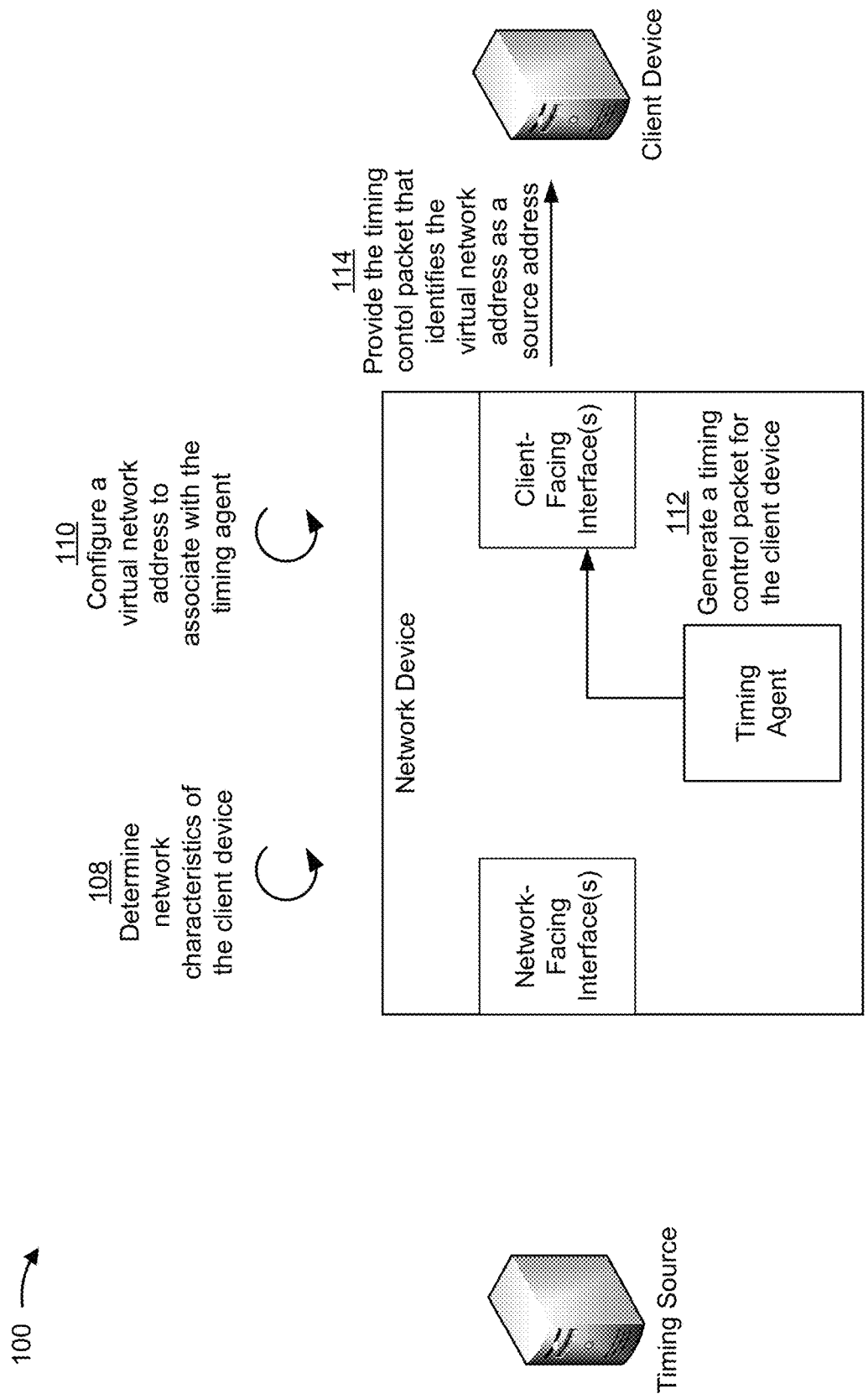

As shown in FIG. 1B, and by reference number 108, the network device may determine network characteristics of the client device. For example, the network device may determine an address range that is reachable by the client device. In some implementations, the address range may match a protocol of a network address of the client device (e.g., IP version 4, IP version 6), a subnet of the network address of the client device, and/or the like.

As shown by reference number 110, the network device may select a virtual network address to be associated with the timing agent. The virtual network address may be within a network address range that is reachable by the client device. For example, the virtual network address may be based on the network characteristics of the client device (e.g., a protocol, a subnet, and/or the like). In some implementations, the network device may receive instructions from another network device, a network administration device, a policy device, and/or the like that identify a virtual network address to select based on the client device to which the timing information is to be provided, a client (e.g., comprising multiple client devices and/or multiple sites of client devices) associated with the client device, and/or the like. In some implementations, the virtual network address may be a multicast network address or a unicast network address.

In some implementations, the network device may select multiple virtual network addresses to be associated with the timing agent. For example, the network device may provide an interface between the network and multiple client devices. One or more of the multiple client devices may be in different subnets and/or may have reachability to different address ranges. In some implementations, two or more of the multiple client devices may be in the same subnet and/or may have reachability to the same address range. In these implementations, the network device may associate the same virtual network address to the timing agent for providing timing control packets to multiple client devices.

The virtual network address may be unbound from a physical interface and/or a logical interface on the network device (e.g., one of the client-facing interfaces). This means that the timing agent may provide timing control packets via various interfaces of the network device and may receive timing control packets from the client device via various interfaces. In some implementations, the timing agent may provide timing control packets to a first client device via a first interface and may provide timing control packets to a second client device via a second interface. Similarly, the timing agent may receive timing control packets from the first client device via the first interface and may receive timing control packets from the second client device via the second interface.

As shown by reference number 112, the timing agent may generate a timing control packet for the client device. For example, the timing control packet may comprise a PTPoIP control packet. The timing control packet may identify the virtual network address as a source of the timing control packet. This may identify, to the client device, the network address through which the client device may request timing information. The timing agent may provide a time stamp to indicate a time at which the timing control packet was generated. This information may be used by the client device to further correct the timing data when it arrives at the client device.

In some implementations, the network device may use an outbound direct relaying process. For example, the timing agent may provide the timing control packet to a component of the network device (e.g., a controller, a packet forwarding engine, a switching component, and/or the like). The timing control packet may include or may be sent with data (e.g., metadata) that indicates a client-facing interface through which the network device is to send to timing control packet. The outbound direct relaying process does not rely on bridging tables or routing tables to direct traffic to the timing agent.

By using a direct relaying process to forward timing control packets to the timing agent, the network device conserves computing resources that might otherwise be used to build and maintain bridging tables and routing tables to route the timing control packets to the timing agent. Additionally, by enabling the timing agent to provide the timing control packets to multiple client devices over various client facing interfaces, the network device may conserve computing resources that might otherwise have been used to operate different timing agents for each of the client facing interfaces.

As shown by reference number 114, the network device may provide the timing control packet that identifies the virtual network address as a source network address. In some implementations, the network device may provide the timing control packet as a PTPoIP control packet. In some implementations, the network device provides timing control packets periodically, based on requests from the client device, based on requests from another client device, based on a policy associated with the client device, and/or the like.

In some implementations, the network device acts as a boundary clock master towards the client device, which includes a clock that acts as a slave clock. The client device may use the timing information to update the clock of the client device. In some implementations, the clock of the client device may act as a master clock for one or more clocks of other client devices that are local to the client device (e.g., connected via a connection that does not use the network).

By the network providing the timing control packet from the timing agent of the network device, the client device may receive timing information from the network that is corrected for time spent traversing the network to arrive at the client device from a device including a grandmaster clock. This may allow the client device to perform timing-sensitive operations. This may also reduce errors caused by errors in timing between client devices, which may conserve computing and/or networking resources that might otherwise be used to detect and recover from the errors.

In some implementations, the network device may monitor data and/or control packets from the network for packets including the virtual network address as a source network address of the packets. In some implementations, the network device may drop packets having the virtual network address as a source network address unless the packets were generated by the timing agent. In some implementations, the network device may only drop timing control packets (e.g., PTPoIP control packets) that include the virtual network address as the source network address.

Figure 1C:
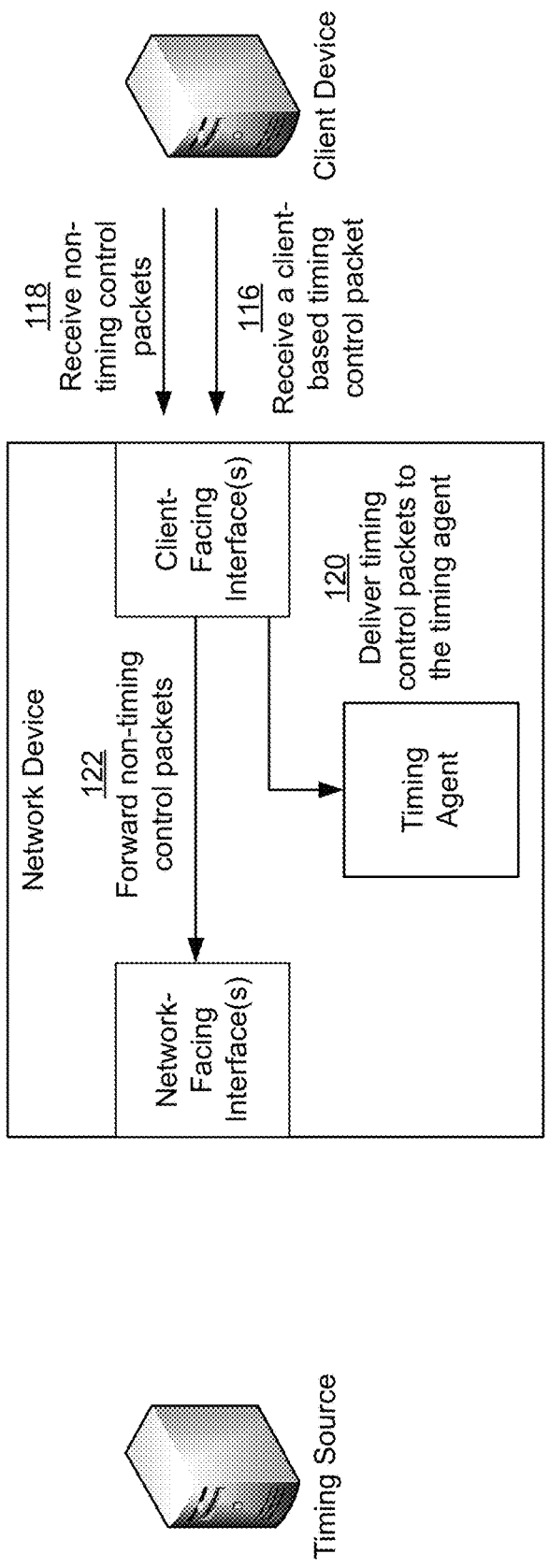

As shown in FIG. 1C, and by reference number 116, the network device may receive a client-based timing control packet from the client device. In some implementations, the client device may determine the virtual network address based on the timing control packet provided by the network device. In some implementations, the client device may determine the virtual network address based on a policy received from a provider of the network. For example, the provider may identify, as part of configuring the client device and/or the network device for providing the overlay network, the virtual network address as a network address for requesting timing information. In some implementations, the client device may provide the client-based timing control packet without first receiving the timing control packet, from the network device, that identifies the virtual network address.

The client-based timing control packet may request timing information for the client device and/or other client devices. The request may identify a requested periodicity for providing the timing information, a protocol (e.g., PTP, PTPoIP, and/or the like) for receiving the timing information, and/or the like. In some implementations, the client-based timing control packet is used to trigger the timing agent to generate a timing control packet.

As shown by reference number 118, the network device may receive non-timing data packets. The non-timing data packets may identify one or more network addresses associated with one or more other client devices accessible over the overlay network. For example, the non-timing data packets may include data associated with high-frequency trading operations, telecommunication, IP video broadcasting and/or editing, and/or the like.

As shown by reference number 120, the network device may deliver timing control packets to the timing agent. For example, when the network device receives the client-based timing control packet and the non-timing data packets, the network device may filter the client-based timing control packets to deliver to the timing agent based on identifying the virtual network address as the destination network address.

In some implementations, the network device may use an inbound direct relaying process (e.g., a filter-based forwarding process that filters timing control packets to the timing agent based on the virtual network address). The inbound direct relaying process does not rely on bridging tables or routing tables to direct traffic to the timing agent.

By using a direct relaying process to forward timing control packets to the timing agent, the network device conserves computing resources that might otherwise be used to build and maintain bridging tables and routing tables to route the timing control packets to the timing agent. Additionally, by enabling the timing agent to provide the timing control packets to multiple client devices over various client facing interfaces, the network device may conserve computing resources that might otherwise have been used to operate different timing agents for each of the client facing interfaces.

As shown by reference number 122, the network device may forward non-timing data packets via the one or more network-facing interfaces. The network device may prepare non-timing data packets for transporting through the network by encapsulating the non-timing data packets, attaching one or more identifier (e.g., for an MPLS network or VXLAN), and/or the like. The network device may forward the non-timing data packets through the network via tunneling.

Figure 1D:
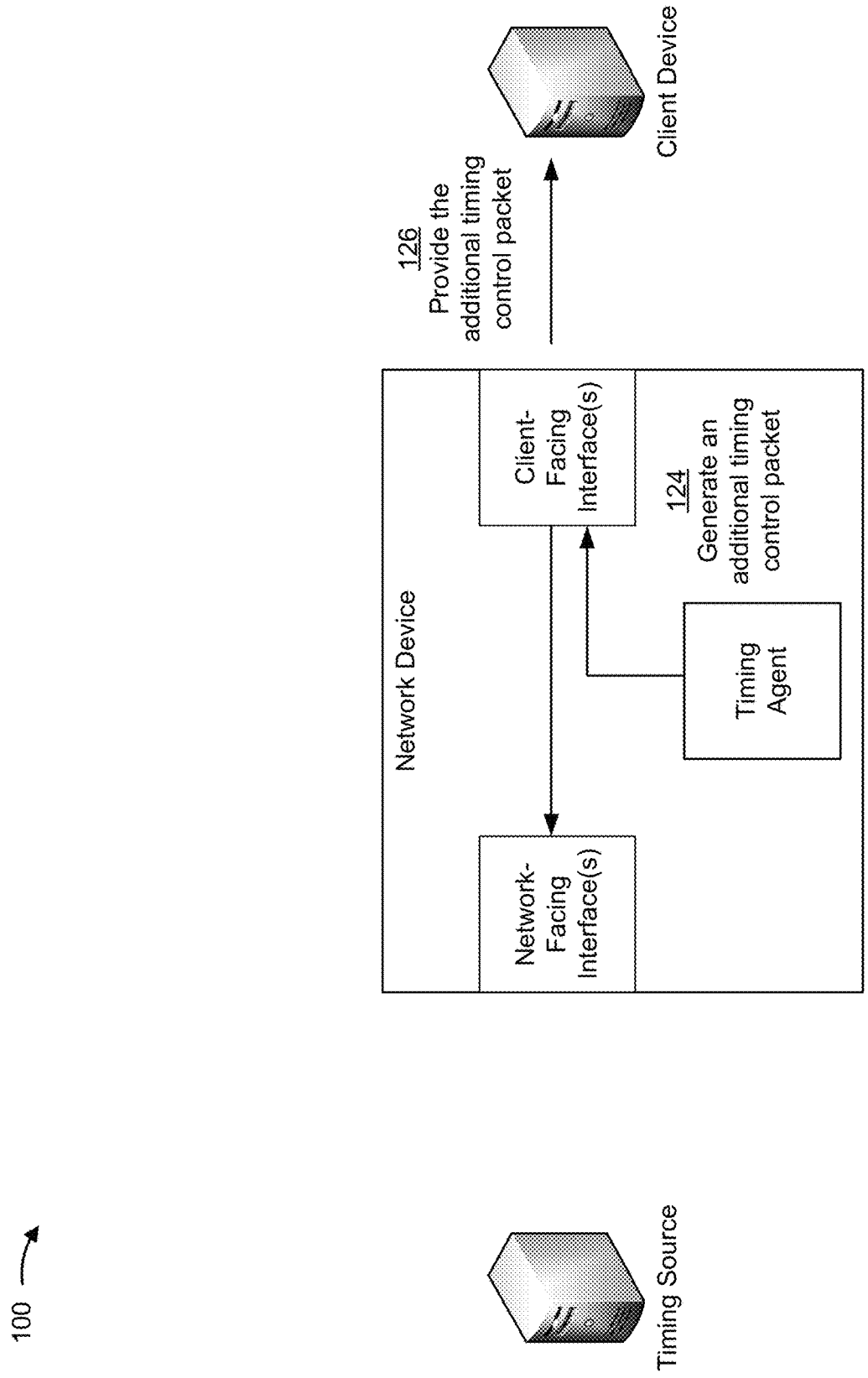

As shown in FIG. 1D, and by reference number 124, the timing agent of the network device may generate an additional timing control packet. For example, the timing agent may identify a source of the client-based timing control packet to determine characteristics of the additional timing control packet. For example, the timing agent may determine a destination network address of the additional timing control packet based on a source network address of the client-based timing control packet. Additionally, or alternatively, the timing agent may determine a source network address for the additional timing control packet based on a destination network address of the client-based timing control packet (e.g., to select the source network address from a set of virtual network addresses associated with the timing agent for providing timing information to multiple client devices).

The timing agent may provide the additional timing control packet comprising the timing information to another component of the network device (e.g., using an outbound direct relaying process). For example, the one or more client-facing interfaces may receive the timing control packet (e.g., via a controller, a packet forwarding engine, a switching component, and/or the like). The one or more client-facing interfaces or an associated controller may determine an interface (e.g., a port, a logical interface, and/or the like) to use to provide the additional timing control packet (e.g., using metadata of the additional timing control packets). In some implementations, the one or more client-facing interfaces or the associated controller may determine the interface based on an indication from the timing agent, based on an interface from which the client-based timing control packet was received, and/or the like.

As shown by reference number 126, the network device may provide the additional control timing packet to the client device. In some implementations, the network device may provide the additional timing control packet via a network layer communication. The client device may use the timing information contained in the additional timing control packet to update the clock on the client device.

By permitting the client device to request timing information via the client-based timing control packet addressed to the virtual network address, the client device may request timing information from the timing agent that can provide the timing information with corrections based on time spent traversing network equipment.

Figure 1E:
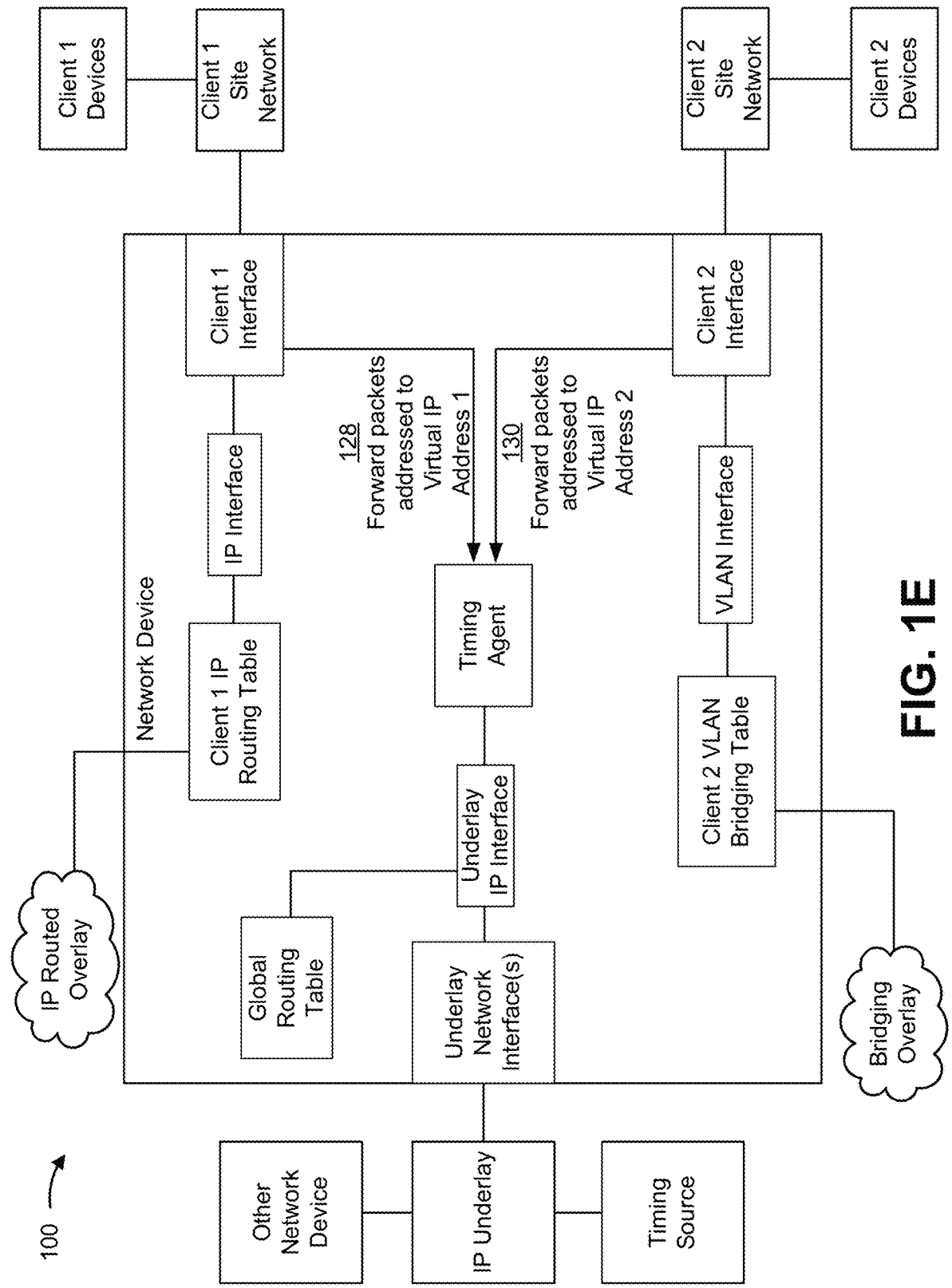

As shown in FIG. 1E, the network device may include one or more paths for routing and/or forwarding packets (control packets, data packets, and/or the like). A client 1 interface may interface with client 1 devices via client 1 site network to send and/or receive packets. A client 2 interface may interface with client 2 devices via client 2 site network to send and/or receive packets.

As shown by reference number 128, when client 1 interface receives packets that are addressed to virtual IP address 1, client interface 1 may forward (e.g., via an inbound direct relaying process) the packets to the timing agent. This way, the IP interface does not need to lookup virtual IP address 1 in a client 1 IP routing table, which may also require the client 1 IP routing table to maintain a record of the virtual IP address. The client 1 interface may use the IP interface (which may access the client 1 IP routing table) to forward the other data packets via an IP routed overlay. Similarly, the timing agent may provide packets to client interface 1 via an outbound direct relaying process for delivery to the client 1 devices.

As shown by reference number 130, when client 2 interface receives packets that are addressed to virtual IP address 2, client interface 2 may forward (e.g., via an inbound direct relaying process) the packets to the timing agent. This way, the network device may conserve computing resources that may otherwise be used to create and maintain a dummy IP interface and a dummy IP routing table to determine where to route the packets that are addressed to virtual IP address 2. The client 2 interface may use a virtual local area network (VLAN or VXLAN) interface (which may access a client 2 VLAN routing table) to forward the other data packets via a bridging overlay. Similarly, the timing agent may provide packets to client interface 2 via an outbound direct relaying process for delivery to the client 2 devices.

The timing agent may send and/or receive packets via the underlay network via one or more underlay network interfaces. To send packets via the underlay network, an underlay IP interface may access a global routing table to lookup routing procedures based on destination IP addresses. The one or more underlay network interfaces may communicate with one or more timing sources, other network devices (e.g., ingress nodes, egress nodes, and/or the like), and/or the like via an IP underlay.

As indicated above, FIGS. 1A-1E are provided merely as one or more examples. Other examples may differ from what is described with regard to FIGS. 1A-1E.

Figure 2:
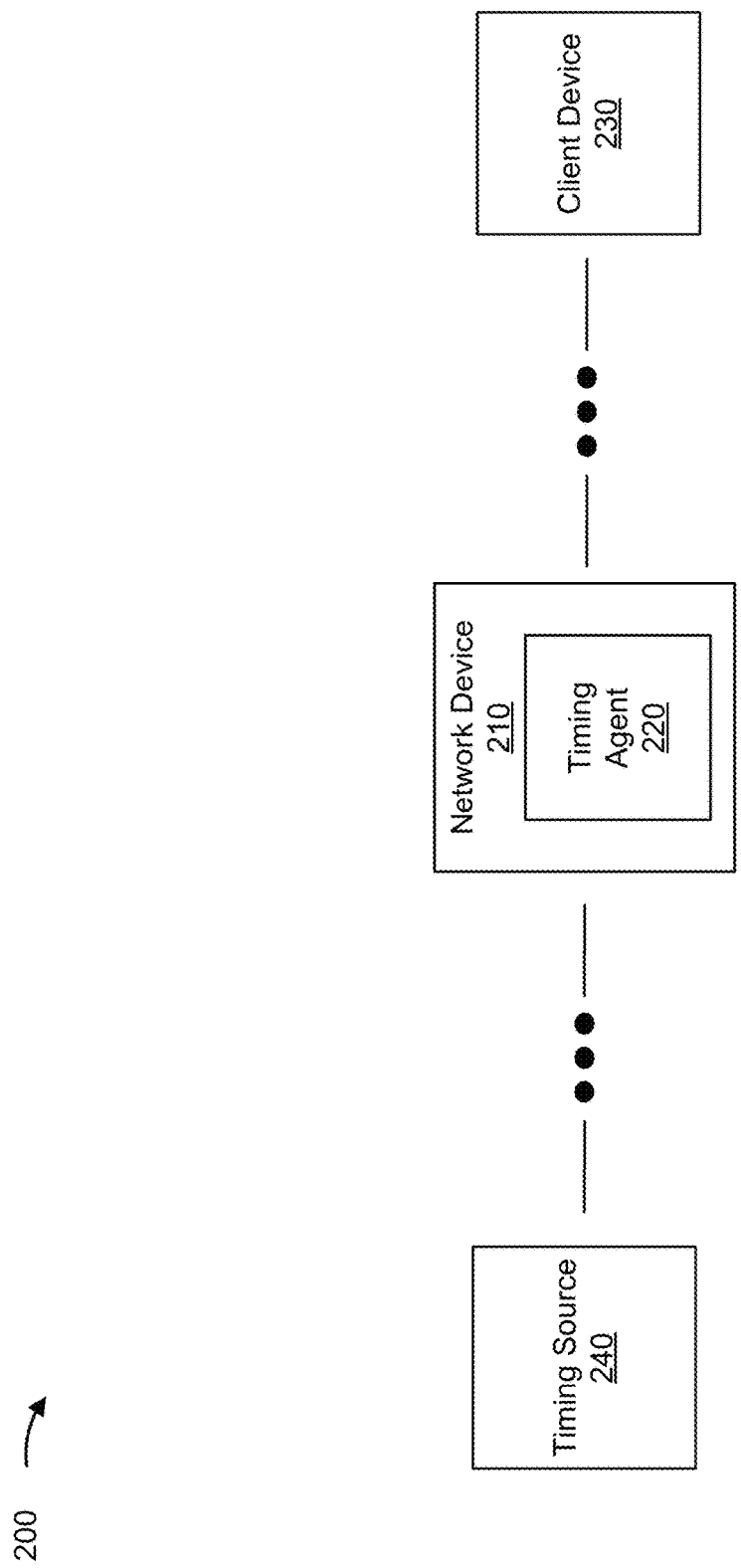
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network device 210, a timing agent 220, a client device 230, and a timing source 240. Devices of environment 200 may interconnect via wired connections, wireless connections, or a combination of wired and wireless connections.

Network device 210 includes one or more devices capable of receiving, storing, generating, processing, forwarding, and/or transferring information. For example, network device 210 may include a router, a switch (e.g., a top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 210 may be a physical device implemented within a housing, such as a chassis. In some implementations, network device 210 may be a virtual device implemented by one or more computer devices of a cloud computing environment or a data center. In some implementations, network device 210 may provide one or more interfaces between a network and client device 230. In some implementations, network device 210 may receive timing information from timing source 240 via one or more hops of the network. Network device 210 may comprise timing agent 220.

Timing agent 220 includes one or more devices capable of receiving, storing, generating, processing, forwarding, and/or transferring information. Timing agent 220 may be separate from a processor, memory, storage component, communication interface, and or the like of network device 210. For example, timing agent 220 may include a one or more components such as a processor (e.g., a CPU, a GPU, an APU, a microprocessor, a microcontroller, a DSP, an FPGA, an ASIC, or another type of processing component), memory, and/or a storage component. The one or more components may be dedicated to the timing agent (e.g., separate from components such as a controller, switching component, processor, memory, and/or storage component of the network device 210 used for routing and/or other operations of the network device). In some implementations, timing agent 220 receives timing information from timing source 240, stores the timing information, generates a timing control packet for client device 230, and provides the timing control packet to another component of network device 210 for delivery to client device 230.

Client device 230 includes one or more devices capable of receiving, generating, storing, processing, and/or providing information associated with communicating over the network via network device 210. For example, client device 230 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, client device 230 may include a network device such as a router, a switch, a gateway, a firewall device, a modem, a hub, a bridge, a network interface controller (NIC), a reverse proxy, a server (e.g., a proxy server), a multiplexer, a security device, an intrusion detection device, a load balancer, or a similar device.

Timing source 240 may include one or more devices capable of receiving, generating, storing, processing, and/or providing information associated with timing information. In some implementations, timing source 240 may receive timing information for the network from one or more of a global positioning system receiver, an atomic clock, another device that receives timing information from a timing source, and/or the like. For example, timing source 240 may include a server, a security device, a device implementing a virtual machine, cloud computing resources, and/or the like.

The number and arrangement of devices and networks shown in FIG. 2 are provided as one or more examples. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to network device 210, timing agent 220, a client device 230, and/or timing source 240. In some implementations, network device 210, timing agent 220, a client device 230, and/or timing source 240 may include one or more devices 300 and/or one or more components of device 300. As shown in FIG. 3, device 300 may include a bus 305, a processor 310, a memory 315, a storage component 320, an input component 325, an output component 330, and a communication interface 335.

Figure 3A:
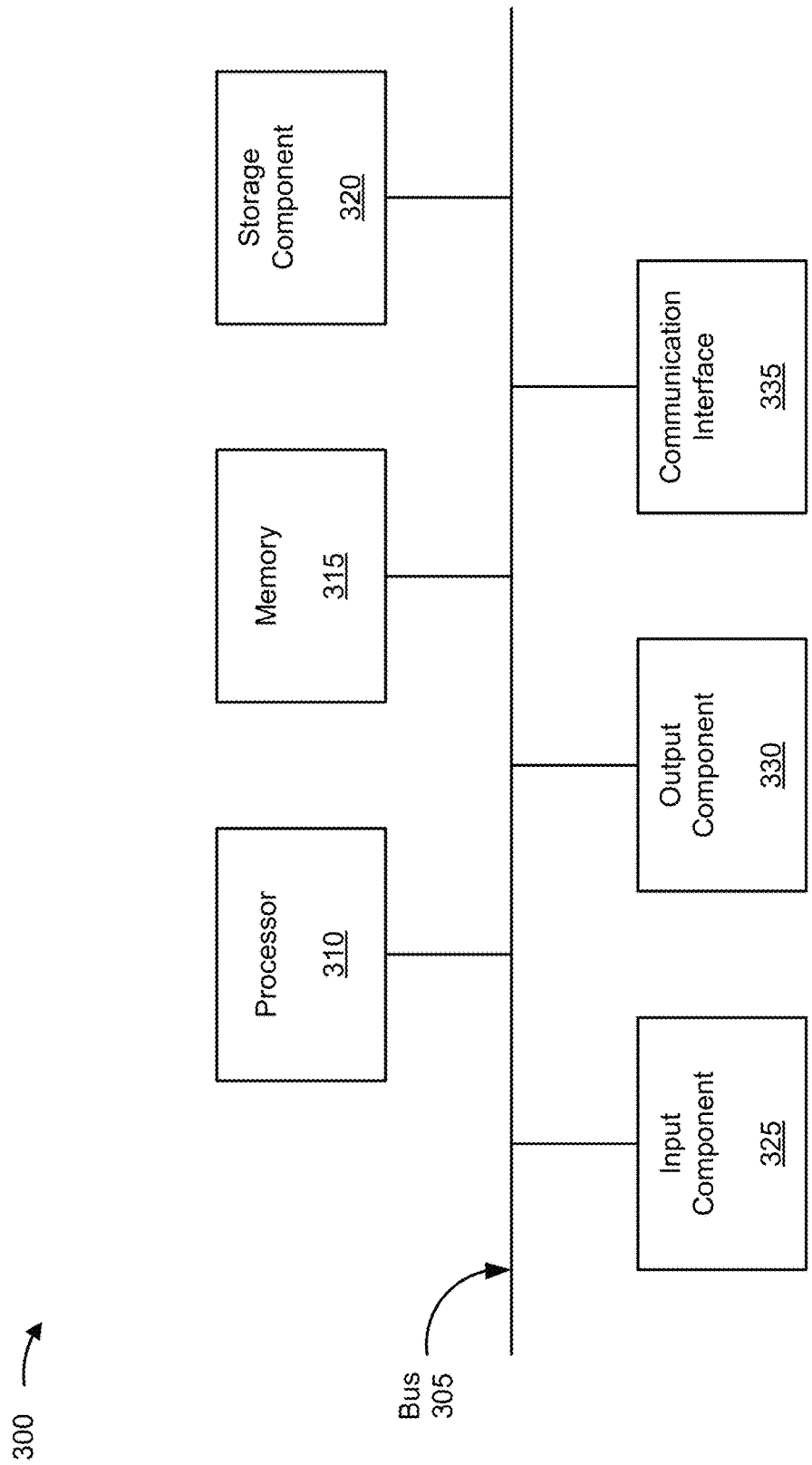
FIGS. 3A and 3B are diagrams of example components of one or more devices of FIG. 2.

FIG. 3A is a diagram of example components of a device 300. Device 300 may correspond to network device 210, timing agent 220, client device 230, and/or timing source 240. In some implementations, network device 210, timing agent 220, client device 230, and/or timing source 240 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
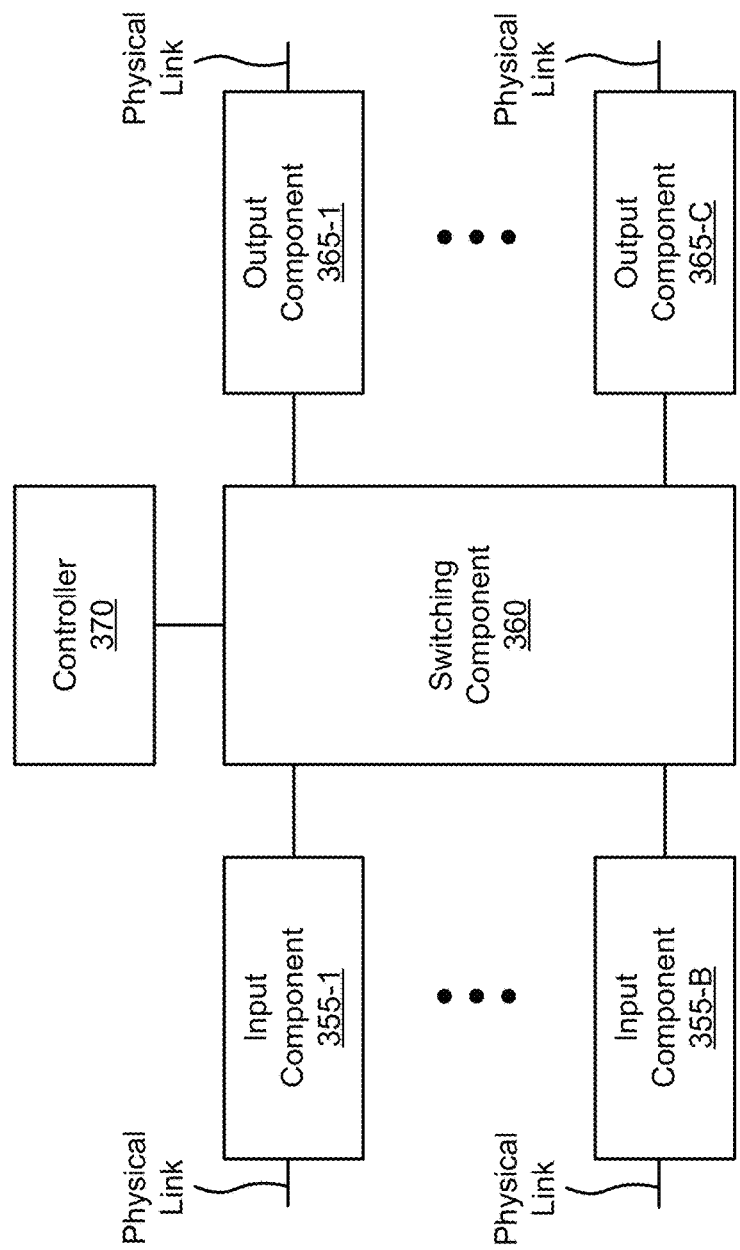

FIG. 3B is a diagram of example components of a device 350. Device 350 may correspond to one or more of network device 210, timing agent 220, client device 230, and/or timing source 240. In some implementations, one or more of network device 210, timing agent 220, client device 230, and/or timing source 240 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input components 355 may process incoming traffic, such as by performing data link layer encapsulation or decapsulation. In some implementations, input components 355 may send and/or receive packets. In some implementations, input components 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
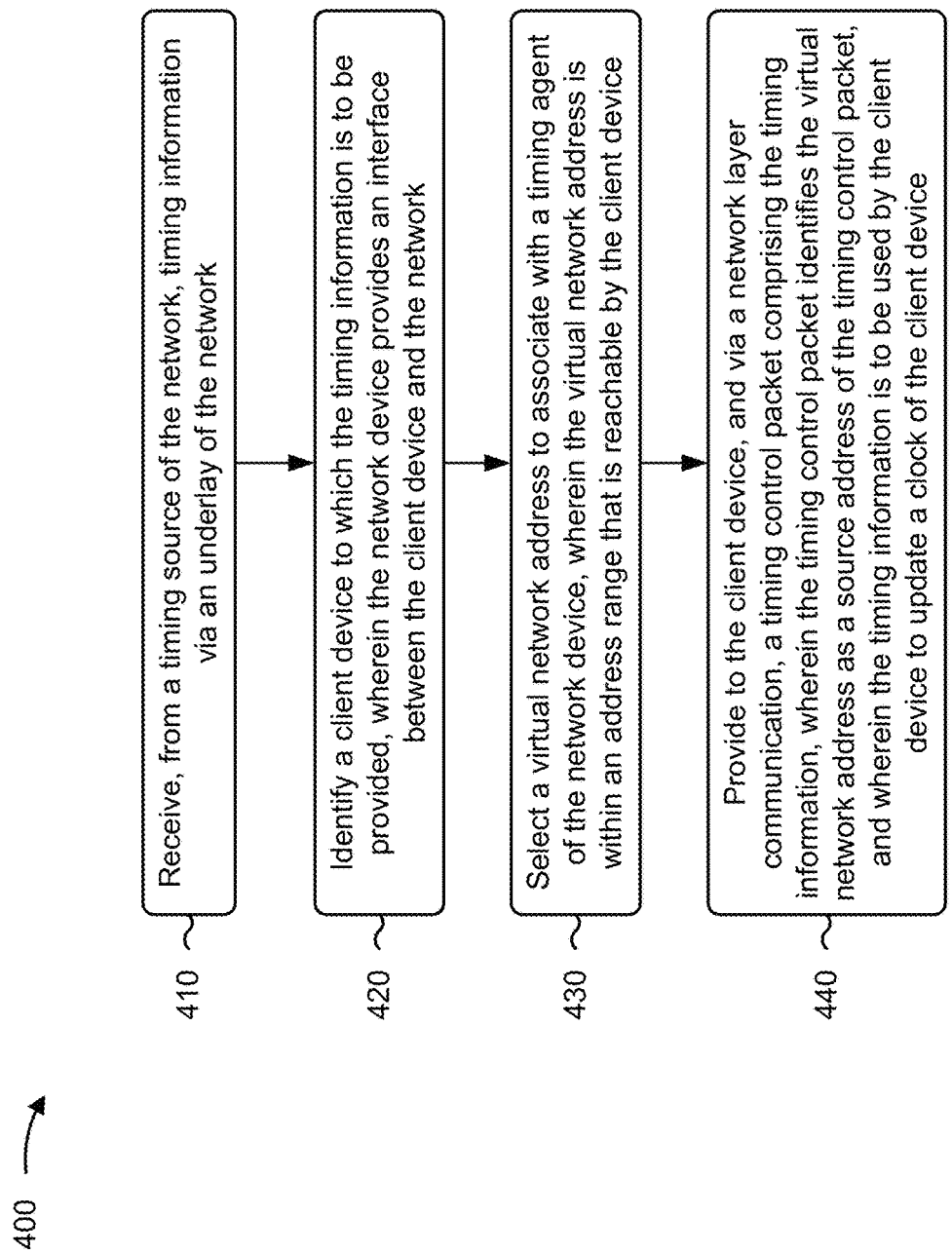
FIGS. 4-6 are flowcharts of example processes for providing timing information from a network via a virtual network address.

FIG. 4 is a flow chart of an example process 400 for providing timing information from a network via a virtual network address. In some implementations, one or more process blocks of FIG. 4 may be performed by a network device (e.g., network device 210). In some implementations, one or more process blocks of FIG. 4 may be performed by another device or a group of devices separate from or including the network device, such as a timing agent (e.g., timing agent 220), a client device (e.g., client device 230), a timing source (e.g., timing source 240), and/or the like.

As shown in FIG. 4, process 400 may include receiving, by a network device of a network and from a timing source of the network, timing information via an underlay of the network (block 410). For example, the network device (e.g., using processor 310, memory 315, storage component 320, input component 325, output component 330, communication interface 335 and/or the like) may receive, by a network device of a network and from a timing source of the network, timing information, as described above.

As further shown in FIG. 4, process 400 may include identifying a client device to which the timing information is to be provided, wherein the network device provides an interface between the client device and the network (block 420). For example, the network device (e.g., using processor 310, memory 315, storage component 320, input component 325, output component 330, communication interface 335 and/or the like) may identify a client device to which the timing information is to be provided, as described above. In some implementations, the network device provides an interface between the client device and the network.

As further shown in FIG. 4, process 400 may include selecting a virtual network address to associate with a timing agent of the network device, wherein the virtual network address is within an address range that is reachable by the client device (block 430). For example, the network device (e.g., using processor 310, memory 315, storage component 320, input component 325, output component 330, communication interface 335 and/or the like) may select a virtual network address to associate with a timing agent of the network device, as described above. In some implementations, the virtual network address is within an address range that is reachable by the client device.

As further shown in FIG. 4, process 400 may include providing to the client device, and via a network layer communication, a timing control packet comprising the timing information, wherein the timing control packet identifies the virtual network address as a source network address of the timing control packet, and wherein the timing information is to be used by the client device to update a clock of the client device (block 440). For example, the network device (e.g., using processor 310, memory 315, storage component 320, input component 325, output component 330, communication interface 335 and/or the like) may provide to the client device, and via a network layer communication, a timing control packet comprising the timing information, as described above. In some implementations, the timing control packet identifies the virtual network address as a source network address of the timing control packet. In some implementations, the timing information is to be used by the client device to update a clock of the client device.

Process 400 may include additional implementations, such as any single implementation or any combination of implementations described below and/or in connection with one or more other processes described elsewhere herein.

In a first implementation, process 400 includes receiving, from the client device, a client-based timing control packet, wherein the client-based timing control packet identifies the virtual network address as a destination network address; identifying the virtual network address as the destination network address of the client-based timing control packet; providing the client-based timing control packet to the timing agent of the network device; generating, by the timing agent of the network device, an additional timing control packet; and providing, to the client device, the additional timing control packet over an interface over which the network device received the client-based timing control packet, wherein the additional timing control packet identifies the virtual network address as the source network address of the additional timing control packet.

In a second implementation, alone or in combination with the first implementation, the client-based timing control packet comprises a request for the timing information.

In a third implementation, alone or in combination with one or more of the first and second implementations, the timing control packet comprises a PTPoIP control packet.

In a fourth implementation, alone or in combination with one or more of the first through third implementations, the network comprises a multi-protocol label switching network.

In a fifth implementation, alone or in combination with one or more of the first through fourth implementations, the client device comprises at least one of: a physical endpoint, or a virtual endpoint.

In a sixth implementation, alone or in combination with one or more of the first through fifth implementations, providing the timing control packet comprises multicasting the timing control packet toward the client.

In a seventh implementation, alone or in combination with one or more of the first through sixth implementations, the virtual network address is selected, based on a protocol of a network address of the client device, according to internet protocol version 4 or internet protocol version 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
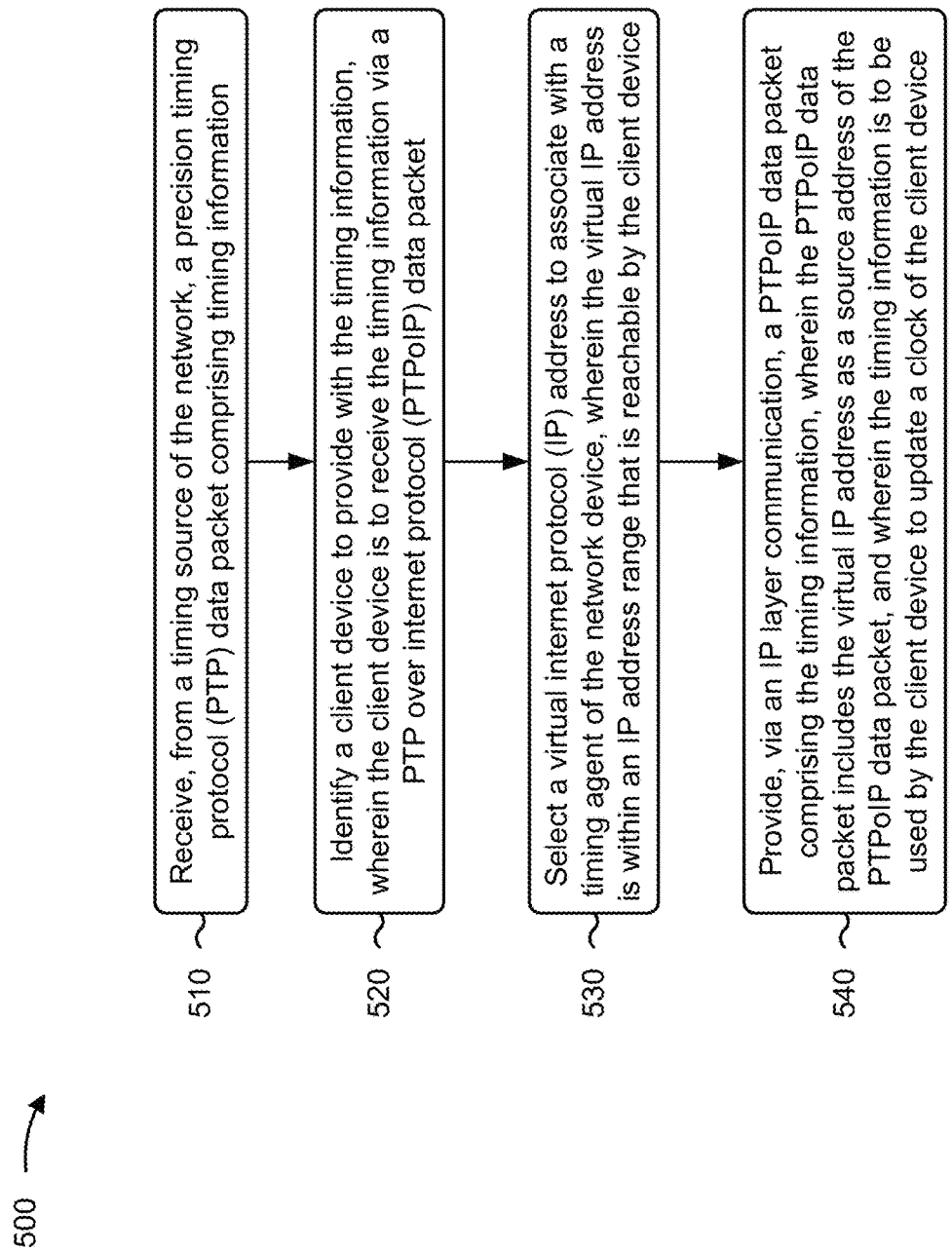

FIG. 5 is a flow chart of an example process 500 for providing timing information from a network via a virtual network address. In some implementations, one or more process blocks of FIG. 5 may be performed by a network device (e.g., network device 210). In some implementations, one or more process blocks of FIG. 5 may be performed by another device or a group of devices separate from or including the network device, such as a timing agent (e.g., timing agent 220), a client device (e.g., client device 230), a timing source (e.g., timing source 240), and/or the like.

As shown in FIG. 5, process 500 may include receiving, from a timing source of the network, a PTP control packet comprising timing information (block 510). For example, the network device (e.g., using processor 310, memory 315, storage component 320, input component 325, output component 330, communication interface 335 and/or the like) may receive, from a timing source of the network, a PTP control packet comprising timing information, as described above.

As further shown in FIG. 5, process 500 may include identifying a client device to provide with the timing information, wherein the client device is to receive the timing information via a PTPoIP control packet (block 520). For example, the network device (e.g., using processor 310, memory 315, storage component 320, input component 325, output component 330, communication interface 335 and/or the like) may identify a client device to provide with the timing information, as described above. In some implementations, the client device is to receive the timing information via a PTPoIP control packet.

As further shown in FIG. 5, process 500 may include selecting a virtual IP address to associate with a timing agent of the network device, wherein the virtual IP address is within an IP address range that is reachable by the client device (block 530). For example, the network device (e.g., using processor 310, memory 315, storage component 320, input component 325, output component 330, communication interface 335 and/or the like) may select a virtual IP address to associate with a timing agent of the network device, as described above. In some implementations, the virtual IP address is within an IP address range that is reachable by the client device.

As further shown in FIG. 5, process 500 may include providing, via an IP layer communication, a PTPoIP control packet comprising the timing information, wherein the PTPoIP control packet includes the virtual IP address as a source network address of the PTPoIP control packet, and wherein the timing information is to be used by the client device to update a clock of the client device (block 540). For example, the network device (e.g., using processor 310, memory 315, storage component 320, input component 325, output component 330, communication interface 335 and/or the like) may provide, via a network layer communication, a PTPoIP control packet comprising the timing information, as described above. In some implementations, the PTPoIP control packet includes the virtual IP address as a source network address of the PTPoIP control packet. In some implementations, the timing information is to be used by the client device to update a clock of the client device.

Process 500 may include additional implementations, such as any single implementation or any combination of implementations described below and/or in connection with one or more other processes described elsewhere herein.

In a first implementation, the network comprises an underlay network and an overlay network, the timing information is transported through the network on the underlay network, the underlay network is transparent to the client device, and the overlay network provides one or more prospective connections visible to the client device.

In a second implementation, alone or in combination with the first implementation, the overlay network provides the one or more prospective connections visible to the client device via a service type including one or more of: ethernet bridging, internet protocol routing, or integrated routing and bridging.

In a third implementation, alone or in combination with one or more of the first and second implementations, the network is to provide a multi-protocol label switching service for the client device.

In a fourth implementation, alone or in combination with one or more of the first through third implementations, the network device is to provide an interface between the client device and the network.

In a fifth implementation, alone or in combination with one or more of the first through fourth implementations, process 500 includes multicasting the timing control packet toward the client device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
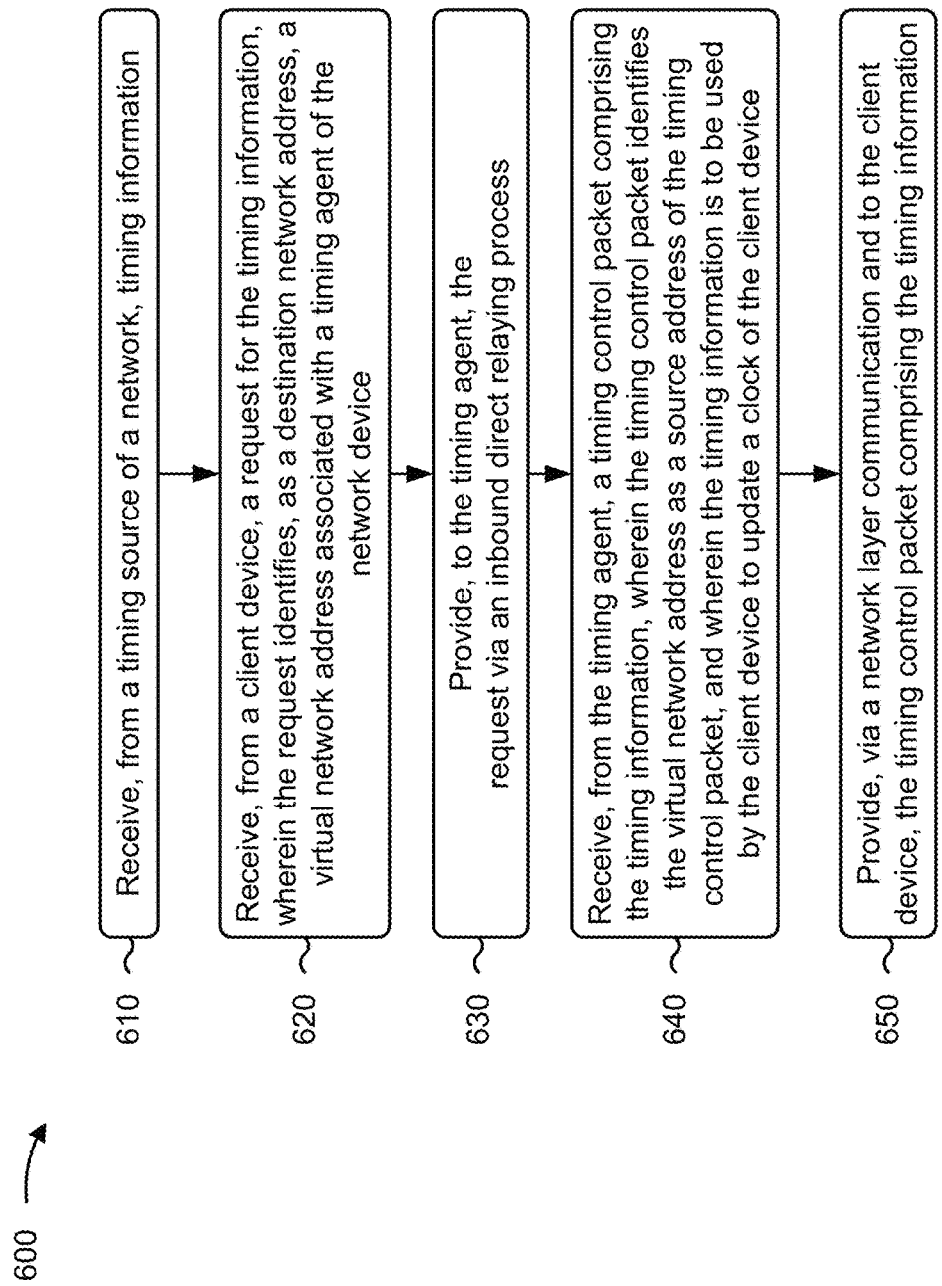

FIG. 6 is a flow chart of an example process 600 for providing timing information from a network via a virtual network address. In some implementations, one or more process blocks of FIG. 6 may be performed by a network device (e.g., network device 210). In some implementations, one or more process blocks of FIG. 6 may be performed by another device or a group of devices separate from or including the network device, such as a timing agent (e.g., timing agent 220), a client device (e.g., client device 230), a timing source (e.g., timing source 240), and/or the like.

As shown in FIG. 6, process 600 may include receiving, from a timing source of a network, timing information (block 610). For example, the network device (e.g., using processor 310, memory 315, storage component 320, input component 325, output component 330, communication interface 335 and/or the like) may receive, from a timing source of a network, timing information, as described above.

As further shown in FIG. 6, process 600 may include receiving, from a client device, a request for the timing information, wherein the request identifies, as a destination network address, a virtual network address associated with a timing agent of the network device (block 620). For example, the network device (e.g., using processor 310, memory 315, storage component 320, input component 325, output component 330, communication interface 335 and/or the like) may receive, from a client device, a request for the timing information, as described above. In some implementations, the request identifies, as a destination network address, a virtual network address associated with a timing agent of the network device.

As further shown in FIG. 6, process 600 may include providing, to the timing agent, the request via an inbound direct relaying process (block 630). For example, the network device (e.g., using processor 310, memory 315, storage component 320, input component 325, output component 330, communication interface 335 and/or the like) may provide, to the timing agent, the request via an inbound direct relaying process (e.g., a filter-based forwarding process that filters timing control packets to the timing agent based on the virtual network address and without relying on bridging tables or routing tables).

As further shown in FIG. 6, process 600 may include receiving, from the timing agent, a timing control packet comprising the timing information, wherein the timing control packet identifies the virtual network address as a source network address of the timing control packet, and wherein the timing information is to be used by the client device to update a clock of the client device (block 640). For example, the network device (e.g., using processor 310, memory 315, storage component 320, input component 325, output component 330, communication interface 335 and/or the like) may receive, from the timing agent, a timing control packet comprising the timing information, as described above. In some implementations, the timing control packet identifies the virtual network address as a source network address of the timing control packet. In some implementations, the timing information is to be used by the client device to update a clock of the client device.

As further shown in FIG. 6, process 600 may include providing, via a network layer communication and to the client device, the timing control packet comprising the timing information (block 650). For example, the network device (e.g., using processor 310, memory 315, storage component 320, input component 325, output component 330, communication interface 335 and/or the like) may provide, via a network layer communication and to the client device, the timing control packet comprising the timing information, as described above.

Process 600 may include additional implementations, such as any single implementation or any combination of implementations described below and/or in connection with one or more other processes described elsewhere herein.

In a first implementation, the timing control packet comprises a PTPoIP control packet.

In a second implementation, alone or in combination with the first implementation, the network comprises an underlay network and an overlay network, the timing information is transported through the network on the underlay network, the underlay network is transparent to the client device, and the overlay network provides one or more prospective connections visible to the client device.

In a third implementation, alone or in combination with one or more of the first and second implementations, the overlay network provides the one or more prospective connections visible to the client device via a service type including one or more of: ethernet bridging, internet protocol routing, or integrated routing and bridging.

In a fourth implementation, alone or in combination with one or more of the first through third implementations, the one or more instructions cause the one or more processors to receive the request for the timing information via a unicast transmission to the virtual network address.

In a fifth implementation, alone or in combination with one or more of the first through fourth implementations, the virtual network address is selected, based on a protocol of a network address of the client device, according to internet protocol version 4 or internet protocol version 6.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the terms traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a first device, an internet protocol (IP) address range that is reachable by a second device;
    determining, by the first device and based on the IP address range, a virtual IP address;
    associating, by the first device, the virtual IP address with a timing component,
        wherein the timing component is associated with serving at least two virtual IP addresses that include the virtual IP address; and
    providing, by the first device and to the second device, a control packet that identifies the virtual IP address as a source address of the control packet
        wherein the control packet comprises timing information that is used to update a clock of the second device, and
        wherein the timing information is received via an underlay of a network that is associated with the first device.

2. The method of claim 1, wherein the control packet is a first control packet, and
    wherein the method further comprises:
        receiving a second control packet from the second device,
            wherein the second control packet identifies the virtual IP address as a destination network address of the second control packet; and
        providing the second control packet to the timing component.

3. The method of claim 1, wherein the control packet is associated with a precision timing protocol (PTP) control packet.

4. The method of claim 1, wherein the timing information is received via a precision timing protocol over internet protocol (PTPoIP) control packet.

5. The method of claim 1, wherein the control packet is a timing control packet, and
    wherein the method further comprises:
        forwarding data packets not associated with the timing control packet via tunneling; and
        forwarding data packets associated with the timing control packet to the timing component.

6. The method of claim 1, wherein the first device provides an interface between the second device and the network.

7. The method of claim 1, wherein the network comprises a multi-protocol label switching network.

8. A first device, comprising:
    one or more memories; and
    one or more processors to:
        determine an internet protocol (IP) address range that is reachable by a second device;
        determine, based on the IP address range, a virtual IP address;
        associate the virtual IP address with a timing component,
            wherein the timing component is associated with serving at least two virtual IP addresses that include the virtual IP address; and
        provide, to the second device, a control packet that identifies the virtual IP address as a source address of the control packet
            wherein the control packet comprises timing information that is used to update a clock of the second device, and
            wherein the timing information is received via an underlay of a network that is associated with the first device.

9. The first device of claim 8, wherein the control packet is a first control packet, and
    wherein the one or more processors are to:
        receive a second control packet from the second device,
            wherein the second control packet identifies the virtual IP address as a destination network address of the second control packet; and
        provide the second control packet to the timing component.

10. The first device of claim 8, wherein the control packet is associated with a precision timing protocol (PTP) control packet.

11. The first device of claim 8, wherein the timing information is received via a precision timing protocol over internet protocol (PTPoIP) control packet.

12. The first device of claim 8, wherein the control packet is a timing control packet, and
wherein the one or more processors are to:
forward data packets not associated with the timing control packet via tunneling; and
forward data packets associated with the timing control packet to the timing component.

13. The first device of claim 8, wherein the first device provides an interface between the second device and the network.

14. The first device of claim 8, wherein the network comprises a multi-protocol label switching network.

15. A non-transitory computer-readable medium storing a set of instructions, the set of instructions comprising:
one or more instructions that, when executed by one or more processors of a first device, cause the first device to:
determine an internet protocol (IP) address range that is reachable by a second device;
determine, based on the IP address range, a virtual IP address;
associate the virtual IP address with a timing component,
wherein the timing component is associated with serving at least two virtual IP addresses that include the virtual IP address; and
provide, to the second device, a control packet that identifies the virtual IP address as a source address of the control packet
wherein the control packet comprises timing information that is used to update a clock of the second device, and
wherein the timing information is received via an underlay of a network that is associated with the first device.

16. The non-transitory computer-readable medium of claim 15, wherein the control packet is a first control packet, and
wherein the one or more instructions, when executed by one or more processors of the first device, cause the first device to:
receive a second control packet from the second device,
wherein the second control packet identifies the virtual IP address as a destination network address of the second control packet; and
provide the second control packet to the timing component.

17. The non-transitory computer-readable medium of claim 15, wherein the control packet is associated with a precision timing protocol (PTP) control packet.

18. The non-transitory computer-readable medium of claim 15, wherein the timing information is received via a precision timing protocol over internet protocol (PTPoIP) control packet.

19. The non-transitory computer-readable medium of claim 15, wherein the first device provides an interface between the second device and the network.

20. The non-transitory computer-readable medium of claim 15, wherein the network comprises a multi-protocol label switching network.

\* \* \* \* \*